(12) United States Patent
Liu et al.

(10) Patent No.: US 9,127,715 B2
(45) Date of Patent: Sep. 8, 2015

(54) BEARING DEVICE FOR MOTION GUIDE DEVICE

(75) Inventors: Jonus Liu, Taichung (TW); Wen Chia Wu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 330 days.

(21) Appl. No.: 13/549,558

(22) Filed: Jul. 16, 2012

(65) Prior Publication Data

US 2014/0016890 A1    Jan. 16, 2014

(51) Int. Cl.
F16C 33/37 (2006.01)
F16H 25/22 (2006.01)
F16C 29/06 (2006.01)

(52) U.S. Cl.
CPC ........ *F16C 33/3706* (2013.01); *F16H 25/2247* (2013.01); *F16C 29/06* (2013.01); *F16H 2025/2271* (2013.01)

(58) Field of Classification Search
CPC ............. F16C 29/06; F16C 33/3706; F16C 33/37–33/374; F16H 25/2247; F16H 2025/2271
USPC ............... 74/424.82, 424.86, 424.87, 424.88, 74/424.81, 424.91; 384/44, 47, 551
See application file for complete search history.

(56) References Cited

U.S. PATENT DOCUMENTS

| 1,405,894 | A |   | 2/1922 | Borg |
|---|---|---|---|---|
| 3,606,504 | A |   | 9/1971 | Wojciochowski |
| 4,547,023 | A | * | 10/1985 | Blatter ............................ 384/44 |
| 4,687,345 | A | * | 8/1987 | Geka ............................... 384/44 |
| 4,896,974 | A |   | 1/1990 | Shimizu |
| 5,597,243 | A | * | 1/1997 | Kaiser et al. ................... 384/551 |
| 6,513,978 | B2 | * | 2/2003 | Shirai et al. ...................... 384/45 |
| 6,575,632 | B2 |   | 6/2003 | Kawaguchi et al. |
| 7,625,120 | B2 |   | 12/2009 | Pan et al. |
| 7,640,820 | B1 |   | 1/2010 | West et al. |

* cited by examiner

*Primary Examiner* — William Kelleher
*Assistant Examiner* — Thomas Magnuson
(74) *Attorney, Agent, or Firm* — Charles E. Baxley

(57) ABSTRACT

A motion guide device includes a rolling passage formed between two members, a number of cylindrical roller bearing members disposed in the rolling passage and engaged between the members, and a number of spacers disposed in the rolling passage and engaged between the cylindrical roller bearing members, the spacers each include two opposite curved depressions for engaging with the cylindrical outer peripheral surfaces of the cylindrical roller bearing members, and each defined by a planar middle surface, a tilted upper surface and a tilted lower surface inclined relative to the planar middle surface and the vertical axis (Z) of the spacer for selectively engaging with the cylindrical roller bearing members.

5 Claims, 7 Drawing Sheets

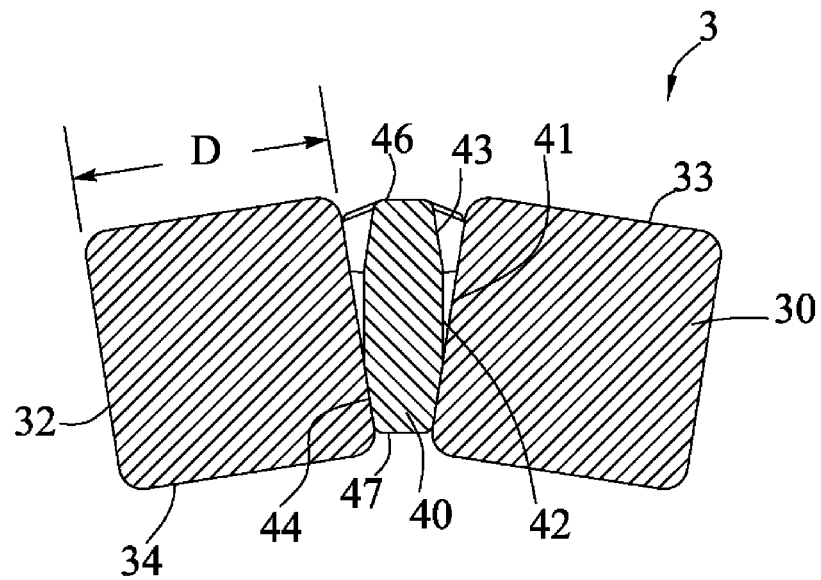
FIG. 9
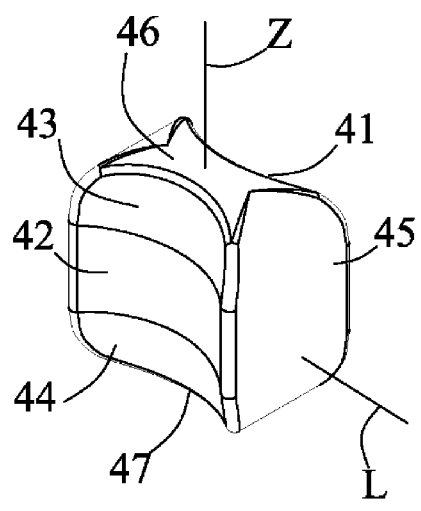 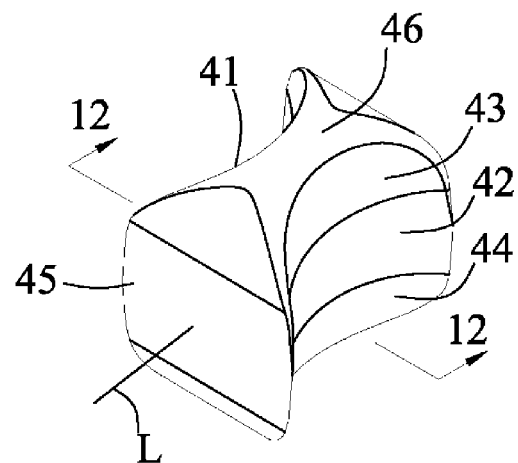
FIG. 10  FIG. 11

BEARING DEVICE FOR MOTION GUIDE DEVICE

BACKGROUND OF THE INVENTION

1. Field of the Invention

The present invention relates to a motion guide device, and more particularly to a motion guide device including a bearing device having a number of cylindrical roller members disposed between two members that are movable relative to each other and having a number of spacers disposed between the cylindrical roller members for suitably spacing the cylindrical roller members from each other.

2. Description of the Prior Art

Typical motion guide devices, such as linear motion guide devices, ball screw devices, ball bearing devices or the like comprise two members that are movable relative to each other, a number of ball bearing members disposed between the two sliding members for suitably spacing the two sliding members from each other and for allowing the two sliding members to be smoothly moved relative to each other.

For allowing the ball bearing members to be suitably spaced or separated from each other, a number of spacers may further be provided and disposed between the ball bearing members for suitably spacing the ball bearing members from each other and for allowing the ball bearing members to be suitably moved or slid along the ball rolling passages that are formed between the two movable or slidable members.

For example, U.S. Pat. No. 1,405,894 to Borg discloses one of the typical ball units also comprising a number of ball bearing members disposed between two movable or slidable members for bearing and facilitating the relative sliding movement between the two movable or slidable members, and a number of spacers disposed between the ball bearing members for suitably spacing the ball bearing members from each other.

However, the ball rolling passages that are formed between the two movable or slidable members include a helical or curved structure that the ball bearing members may also be inclined relative to the spacers, but the spacers of the Borg reference may not be tilted relative to the ball bearing members such that the ball bearing members and the spacers may have a good chance to be interfered with each other.

U.S. Pat. No. 3,606,504 to Wojciochowski discloses another typical linear motion guide device comprising a number of ball bearing members disposed between two members that are movable relative to each other, and a number of spacers disposed between the ball bearing members for suitably spacing the ball bearing members from each other and for preventing the ball bearing members from interfering with each other.

However, the spacers may not be tilted relative to the ball bearing members such that the ball bearing members and the spacers may have a good chance to be interfered with each other.

U.S. Pat. No. 4,896,974 to Shimizu, U.S. Pat. No. 6,575,632 to Kawaguchi et al., U.S. Pat. No. 7,625,120 to Pan et al., and U.S. Pat. No. 7,640,820 to West et al. disclose several further typical motion guide devices each also comprising a number of ball bearing members for being disposed in a ball rolling passage formed by a ball rolling groove formed to a screw shaft and a loaded ball rolling groove formed to a nut, and a number of spacers disposed between the ball bearing members in the ball rolling passage.

However, the spacers are provided for engaging with the ball bearing members, but may not be used for engaging with the cylindrical roller members.

The present invention has arisen to mitigate and/or obviate the afore-described disadvantages of the conventional linear motion guide devices, ball screw devices or ball bearing devices.

SUMMARY OF THE INVENTION

The primary objective of the present invention is to provide a motion guide device including a bearing device having a number of cylindrical roller members disposed between two movable members that are movable relative to each other and having a number of spacers disposed between the cylindrical roller members for suitably spacing the cylindrical roller members from each other.

The other objective of the present invention is to provide a motion guide device including a bearing device having the spacers tiltable and erectable relative to the cylindrical roller members for allowing the spacers to be suitably moved relative to the cylindrical roller members and for preventing the spacers from interfering the movement of the cylindrical roller members.

In accordance with one aspect of the invention, there is provided a motion guide device comprising a first member and a second member including a rolling passage formed between the first and the second member, a plurality of cylindrical roller bearing members disposed in the rolling passage and engaged between the first and the second members for facilitating a movement between the first and the second members, the cylindrical roller bearing members each including a cylindrical outer peripheral surface and two end surfaces, and a plurality of spacers disposed in the rolling passage and engaged between the cylindrical roller bearing members for spacing the cylindrical roller bearing members from each other, wherein the spacers each include two opposite curved depressions formed therein for receiving and engaging with the cylindrical outer peripheral surfaces of the cylindrical roller bearing members respectively, and the depressions of the spacer are each formed and defined by a planar middle surface which is parallel to the vertical axis (Z) of the spacer, a tilted upper surface inclined relative to the planar middle surface and the vertical axis (Z) of the spacer for selectively engaging with the cylindrical outer peripheral surfaces of the cylindrical roller bearing members when the cylindrical roller bearing members are tilted relative to the spacer, and a tilted lower surface inclined relative to the planar middle surface and the vertical axis (Z) of the spacer for selectively engaging with the cylindrical outer peripheral surfaces of the cylindrical roller bearing members when the cylindrical roller bearing members are tilted relative to the spacer.

The spacers each include two flat end surfaces. The spacers each include a curved upper surface. The curved upper surface of the spacer includes a center of curvature (a) offset from a vertical axis (Z) of the spacer. The curved upper surface of the spacer includes a center of curvature (a) offset from a lateral axis (Y) of the spacer.

The spacers each include a curved lower surface. The curved lower surface of the spacer includes a center of curvature (b) offset from a vertical axis (Z) of the spacer. The curved lower surface of the spacer includes a center of curvature (b) offset from a lateral axis (Y) of the spacer.

The spacers each include a curved upper surface and a curved lower surface having centers of curvatures (a, b) arranged and located at opposite quadrants from each other.

Further objectives and advantages of the present invention will become apparent from a careful reading of the detailed description provided hereinbelow, with appropriate reference to the accompanying drawings.

BRIEF DESCRIPTION OF THE DRAWINGS

FIGS. 8, 9 are cross sectional views taken along lines 8-8, and 9-9 of FIGS. 6 and 7 respectively;

FIG. 10 is a perspective view illustrating one of the spacers of the bearing device;

FIG. 11 is another perspective view similar to FIG. 10, illustrating the other angle of the spacer of the bearing device;

DETAILED DESCRIPTION OF THE PREFERRED EMBODIMENT

Figure 1:
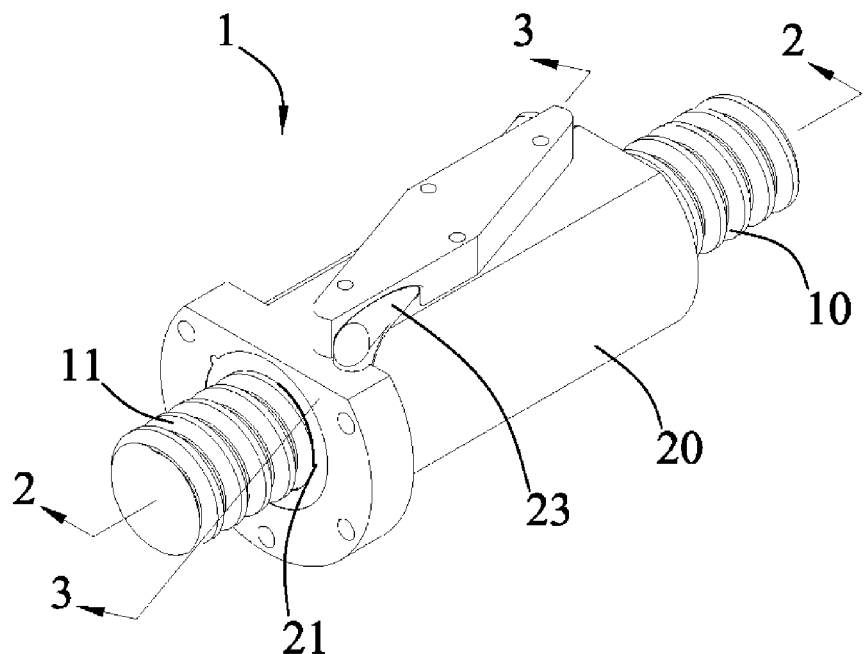
FIG. 1 is a perspective view of a motion guide device or ball screw device in accordance with the present invention.
Figure 2:
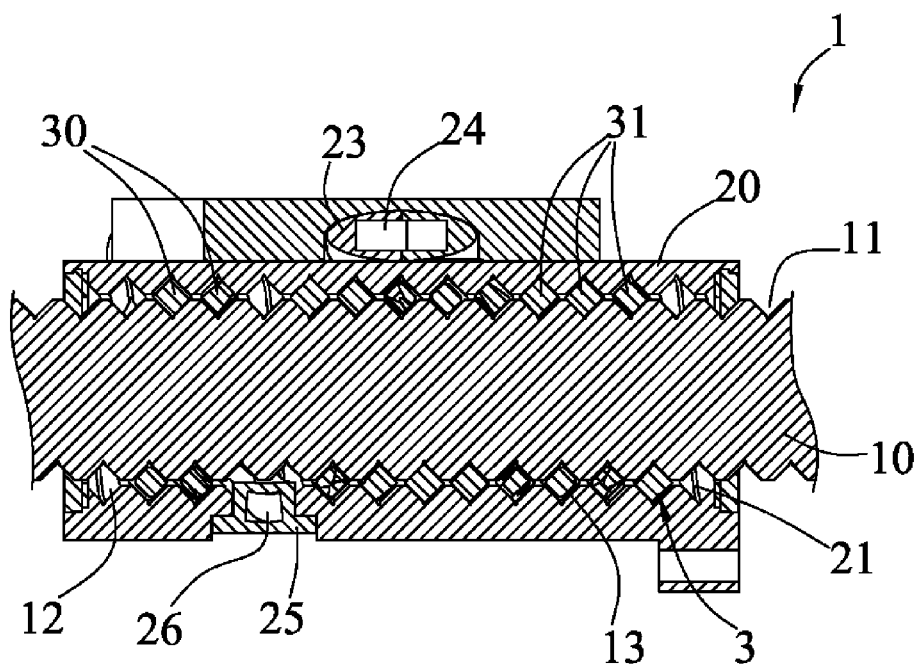
FIG. 2 is a partial cross sectional view of the motion guide device taken along lines 2-2 of FIG. 1.

Referring to the drawings, and initially to FIGS. 1-5, a motion guide device 1, such as a linear motion guide device, a ball screw device, a ball bearing facility or the like in accordance with the present invention comprises two members 10, 20, such as a first member 10 and a second member 20, or a screw shaft 10 and a nut 20 each including a helical rolling groove 11, 21 formed therein and aligned with each other for forming one or more (such as two) endless racing or rolling passages 12, 13 therein or between the screw shaft 10 and the nut 20, for example, the motion guide device 1 may include one or more return pipes or return devices 23 engaged onto the nut 20 and each having a channel 24 provided therein and directed toward or aligned with the rolling passages 12, 13 respectively, and one or more deflecting devices 25 engaged onto the nut 20 and each having a pathway 26 provided therein and directed toward or aligned with the rolling passages 12, 13 respectively for defining two spaced rolling passages 12, 13.

Figure 3:
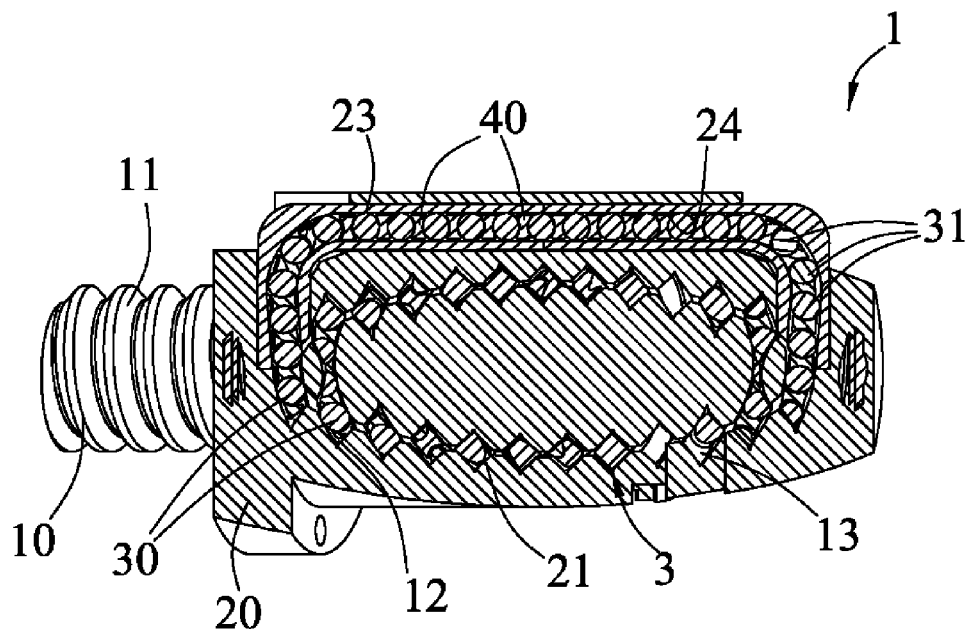
FIG. 3 is a partial cross sectional view of the motion guide device taken along lines 3-3 of FIG. 1.
Figure 4:
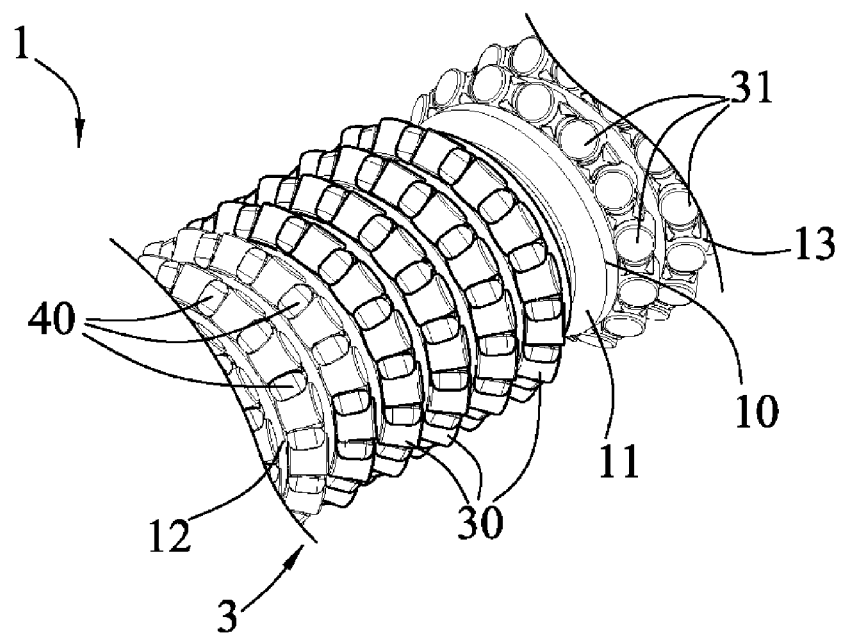
FIG. 4 is a partial perspective view illustrating the bearing device for the motion guide device, in which a portion of the motion guide device has been removed for showing an inner structure of the motion guide device.
Figure 5:
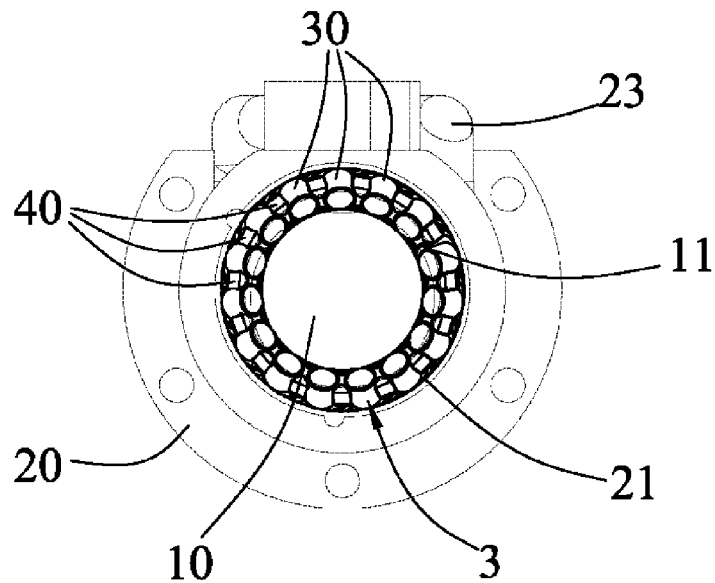
FIG. 5 is an end schematic view of the motion guide device.

A bearing device 3 is further provided and disposed between the two movable or sliding members 10, 20, and includes a number of cylindrical roller or bearing members 30, 31 for suitably spacing the two movable or sliding members 10, 20 from each other and for allowing the two movable or sliding members 10, 20 to be smoothly moved or slid relative to each other, or for facilitating the movement between the two movable or sliding members 10, 20, and the cylindrical roller or bearing members 30, 31 are engaged in the two spaced rolling passages 12, 13 respectively and disposed or arranged in different direction relative to each other, best shown in FIG. 4, for bearing or resisting different loads in different direction relative to the two movable or sliding members 10, 20. A number of spacers 40 may further be provided and disposed between the bearing members 30, 31 (FIGS. 3, 4) for suitably separating the bearing members 30 from each other and for allowing the bearing members 30 to be suitably engaged between the two movable or sliding members 10, 20.

Figure 12:
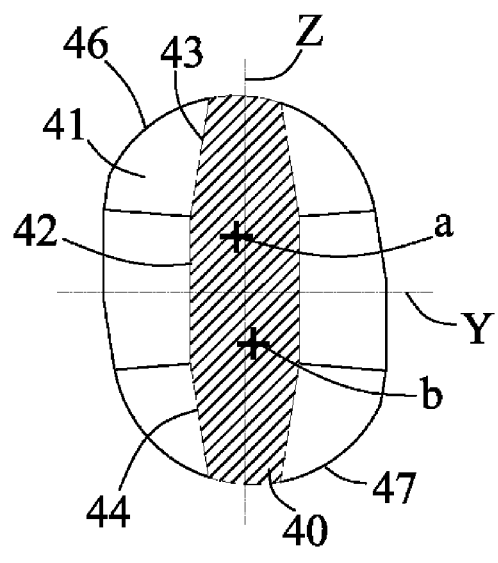
FIG. 12 is a cross sectional view taken along lines 12-12 of FIG. 11.

As shown in FIGS. 6-9 and 13-16, the bearing members 30, 31 each include a cylindrical outer peripheral surface 32, and two end surfaces 33, 34 or an upper surface 33 and a bottom surface 34. The spacers 40 of the bearing device 3 each also include a substantially cylindrical outer appearance having a longitudinal axis (L, FIGS. 6-7, 10-11) arranged in a direction substantially perpendicular to the longitudinal axis (O) of the bearing members 30, 31, and having a vertical axis (Z) substantially parallel to the longitudinal axis (O) of the bearing members 30, 31, and having a lateral axis (Y, FIGS. 6, 12, 17) substantially perpendicular to the longitudinal axis (O) of the bearing members 30, 31 and the vertical axis (Z) and the lateral axis (Y) of the spacers 40.

The length of the spacers 40 in the longitudinal axis (L) is preferable, but not necessary slightly shorter than the outer diameter "D" of the bearing members 30, 31 (FIGS. 3-4, 6-7) for preventing the spacers 40 from being in contact with the two movable or sliding members 10, 20, and the height of the spacers 40 in the vertical axis (Z) is preferable, but not necessary slightly shorter than the height of the bearing members 30, 31 (FIGS. 8-9, 13-16) for preventing the spacers 40 from being in contact with the two movable or sliding members 10, 20, and thus for preventing the spacers 40 from interfering the movement of the cylindrical roller members 30, 31. The spacers 40 each include two curved depressions 41 formed in the opposite sides of the spacer 40 for engaging with the cylindrical outer peripheral surfaces 32 of the bearing members 30, 31, and the depressions 41 of the spacer 40 are each formed by a curved and planar middle or intermediate surface 42 which is parallel to the vertical axis (Z) of the spacer 40, a tilted or inclined upper surface 43 inclined relative to the curved and planar middle or intermediate surface 42 and the vertical axis (Z) of the spacer 40, and a tilted or inclined lower surface 44 also inclined relative to the curved and planar middle or intermediate surface 42 and the vertical axis (Z) of the spacer 40, best shown in FIGS. 8-12.

Figure 6:
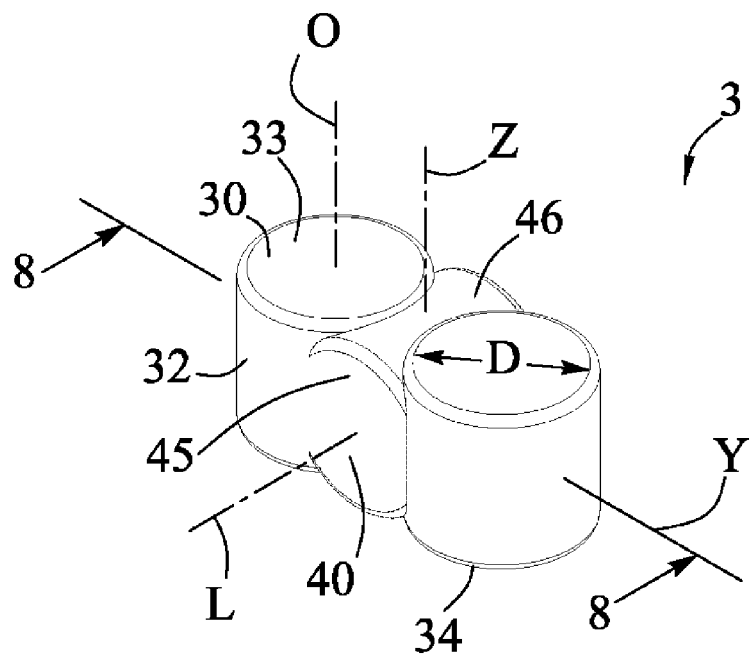
FIG. 6 is a perspective view illustrating one of the spacers and two cylindrical roller members of the bearing device.
Figure 7:
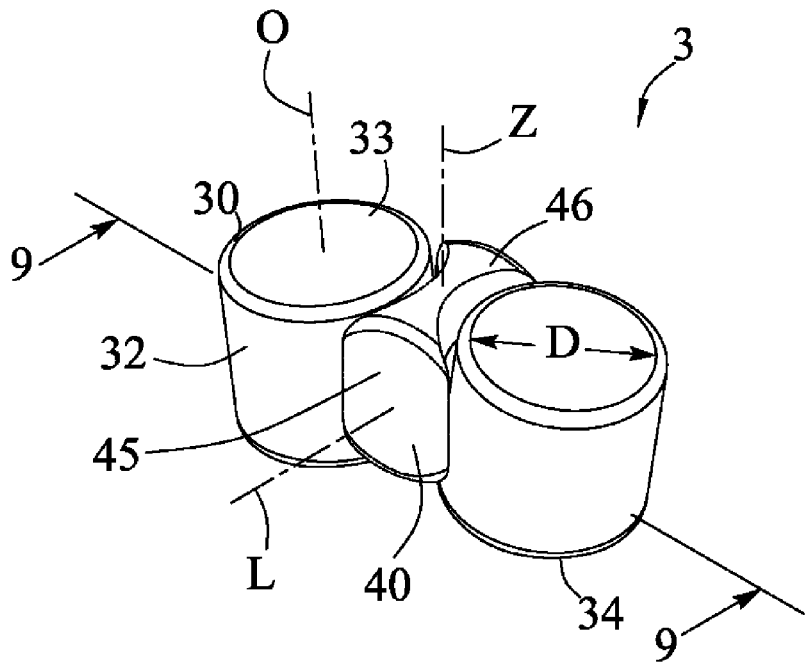
FIG. 7 is another perspective view similar to FIG. 6, illustrating the operation of the cylindrical roller members and the spacer of the bearing device.
Figure 8:
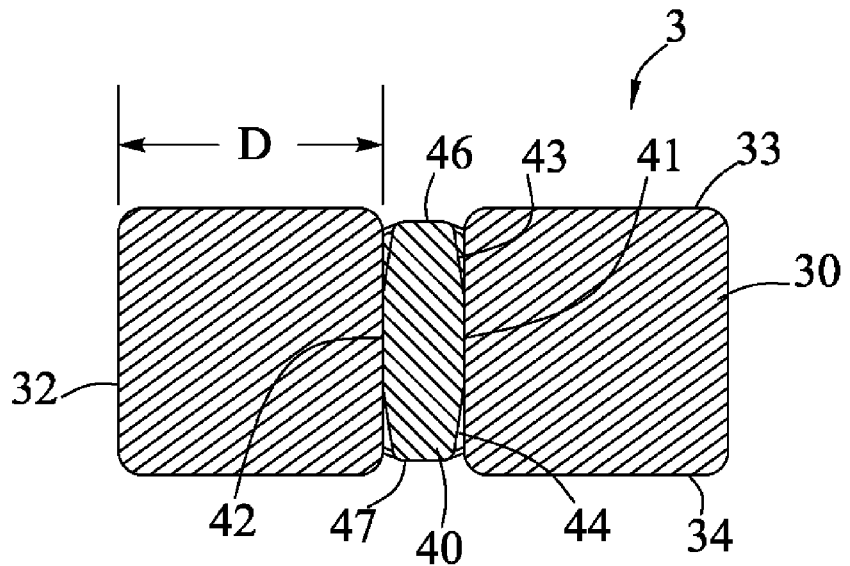

In operation, as shown in FIGS. 3, 6 and 8, the cylindrical roller members 30, 31 may be suitably engaged with the curved and planar middle or intermediate surfaces 42 of the depressions 41 in the opposite sides of the spacers 40 when the cylindrical roller members 30, 31 and the spacers 40 are slidably engaged in the longitudinal channels 24 of the return pipes or return devices 23, and may also be suitably engaged with the inclined upper surfaces 43 or the inclined lower surfaces 44 of the depressions 41 in the opposite sides of the spacers 40 (FIGS. 7, 9) when the cylindrical roller members 30, 31 and the spacers 40 are slidably engaged in the helical or curved portions of the rolling passages 12, 13 of the motion guide device 1. The spacers 40 each include two flat end surfaces 45, and a curved upper surface 46 and a curved lower surface 47. The tilted upper surfaces 43 are inclined from the curved and planar middle or intermediate surfaces 42 toward the curved upper surface 46, and the tilted lower surfaces 44 are tilted from the curved and planar middle or intermediate surfaces 42 toward the curved lower surface 47 to form a spinning wheel shaped structure in the middle portion of the spacer 40 (FIGS. 12-17).

Figure 17:
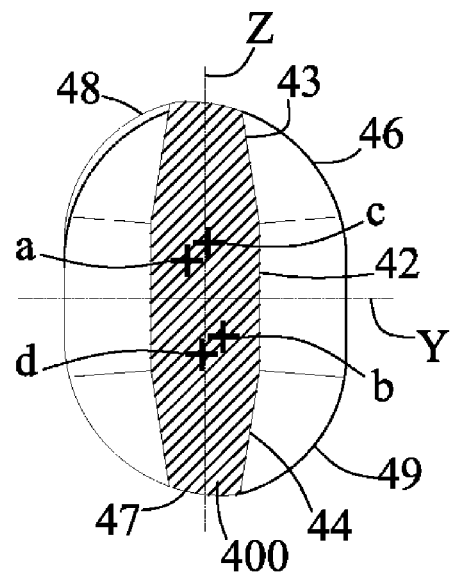
FIG. 17 is a cross sectional view similar to FIG. 12, illustrating the other arrangement of the spacer of the bearing device.
Figure 13:
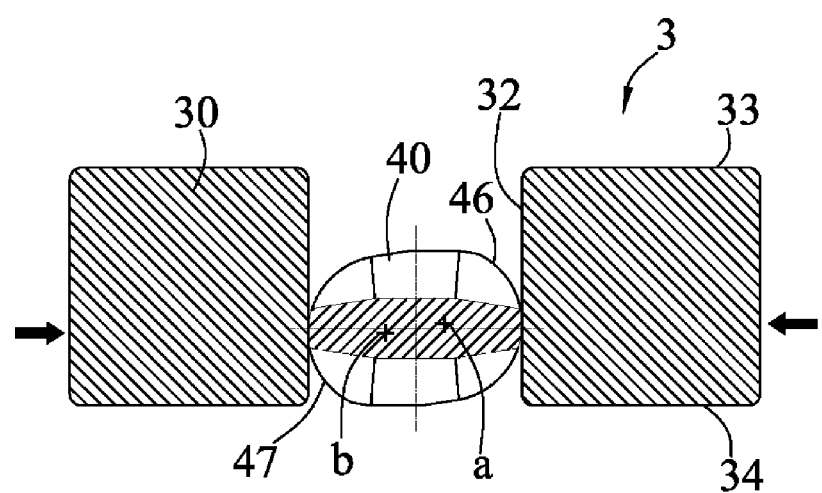
FIGS. 13, 14, 15, 16 are cross sectional views similar to FIG. 12, illustrating the operation of the cylindrical roller members and the spacer of the bearing device.
Figure 14:
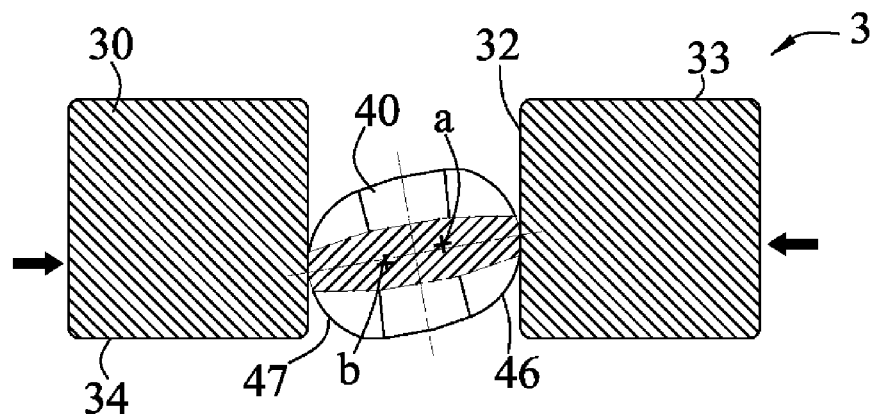
Figure 15:
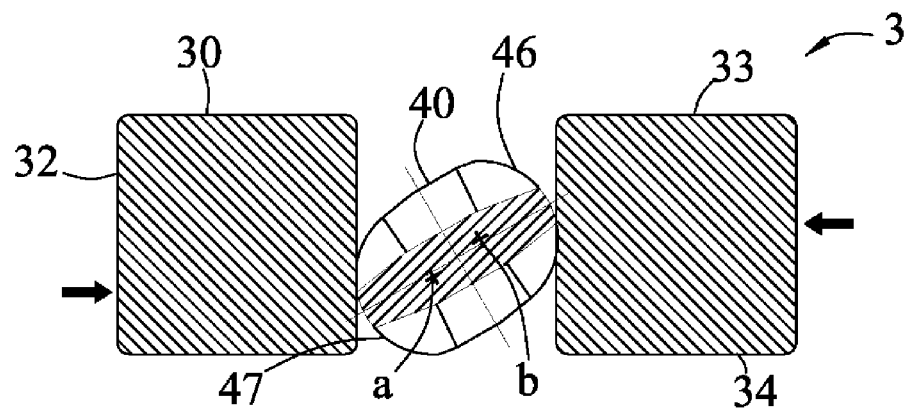
Figure 16:
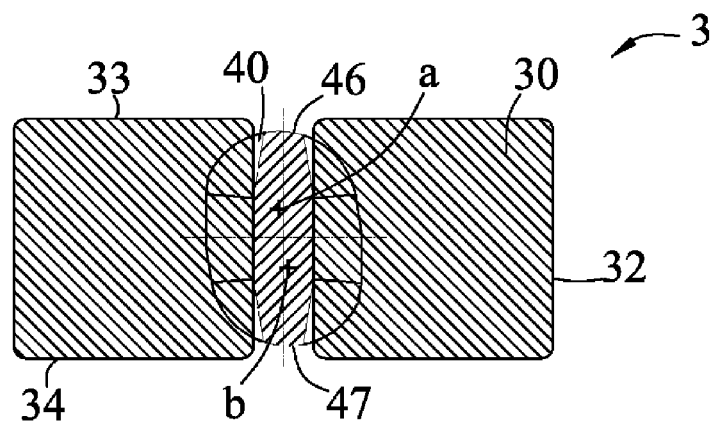

As shown in FIGS. 12-16, as described in further details, the curved upper surface 46 and/or the curved lower surface 47 of the spacer 40 include a center of curvature (a, b) offset from the vertical axis (Z) and the lateral axis (Y) of the spacer 40, and the centers of curvatures (a, b) of the curved upper surface 46 and the curved lower surface 47 of the spacer 40 are preferably arranged at opposite quadrants from each other, and arranged for allowing the spacers 40 to be tilted and erected relative to the cylindrical roller members 30, 31 by the cylindrical roller members 30, 31 when the spacers 40 are depressed by the cylindrical roller members 30, 31, best shown in FIGS. 13-16. Alternatively, as shown in FIG. 17, the spacer 400 may include two curved upper surfaces 46, 48 and two curved lower surfaces 47, 49 having centers of curvatures (a, b, c, d) offset from the vertical axis (Z) and the lateral axis (Y) of the spacer 400, and arranged at different quadrants from each other.

Again, in operation, as shown in FIGS. 3, 6 and 8, when the cylindrical roller members 30, 31 and the spacers 40 are slidably engaged in the longitudinal channels 24 of the return pipes or return devices 23 or the other longitudinal portions of the rolling passages 12, 13 of the motion guide device 1, the cylindrical roller members 30, 31 may be suitably engaged with the curved and planar middle or intermediate surfaces 42 of the depressions 41 in the opposite sides of the spacers 40, where the cylindrical roller members 30, 31 are not inclined relative to the spacers 40; and when the cylindrical roller members 30, 31 and the spacers 40 are slidably engaged in the helical or curved portions of the rolling passages 12, 13 of the motion guide device 1 or of the return pipes or return devices 23, the cylindrical roller members 30, 31 may be tilted relative to the spacers 40 and may be suitably engaged with the inclined upper surfaces 43 or the inclined lower surfaces 44 of the depressions 41 in the opposite sides of the spacers 40 (FIGS. 7, 9), for preventing the spacers 40 and the cylindrical roller members 30, 31 from interfering with each other.

Accordingly, the motion guide device in accordance with the present invention includes a bearing device having a number of cylindrical roller members disposed between two movable members that are movable relative to each other and having a number of spacers disposed between the cylindrical roller members for suitably spacing or separating the cylindrical roller members from each other, and the spacers are tiltable and erectable relative to the cylindrical roller members for allowing the spacers to be suitably moved relative to the cylindrical roller members and for preventing the spacers from interfering the movement of the cylindrical roller members.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:
1. A motion guide device comprising:
a first member and a second member including a rolling passage formed between said first and said second member,
a plurality of cylindrical roller bearing members disposed in said rolling passage and engaged between said first and said second members for facilitating a movement between said first and said second members, said cylindrical roller bearing members each including a cylindrical outer peripheral surface and two end surfaces, and
a plurality of spacers disposed in said rolling passage and engaged between said cylindrical roller bearing members for spacing said cylindrical roller bearing members from each other, said spacers each including a vertical axis (Z),
wherein said spacers each include two flat end surfaces, said spacers each include a curved upper surface, said curved upper surface of said spacer includes a center of curvature (a) offset from said vertical axis (Z) of said spacer and offset from a lateral axis (Y) of said spacer, said spacers each include two opposite curved depressions formed therein for receiving and engaging with said cylindrical outer peripheral surfaces of said cylindrical roller bearing members respectively, and said depressions of said spacer are each formed and defined by a planar middle surface which is parallel to said vertical axis (Z) of said spacer, a tilted upper surface inclined relative to said planar middle surface and said vertical axis (Z) of said spacer for selectively engaging with said cylindrical outer peripheral surfaces of said cylindrical roller bearing members when said cylindrical roller bearing members are tilted relative to said spacer, and a tilted lower surface inclined relative to said planar middle surface and said vertical axis (Z) of said spacer for selectively engaging with said cylindrical outer peripheral surfaces of said cylindrical roller bearing members when said cylindrical roller bearing members are tilted relative to said spacer, said planar middle surface and said tilted upper surface and said tilted lower surface form a convex structure.

2. The motion guide device as claimed in claim 1, wherein said spacers each include a curved lower surface.

3. The motion guide device as claimed in claim 2, wherein said curved lower surface of said spacer includes a center of curvature (b) offset from a vertical axis (Z) of said spacer.

4. The motion guide device as claimed in claim 2, wherein said curved lower surface of said spacer includes a center of curvature (b) offset from a lateral axis (Y) of said spacer.

5. The motion guide device as claimed in claim 1, wherein said spacers each include a curved upper surface and a curved lower surface having centers of curvatures (a, b) arranged and located at opposite quadrants from each other.

* * * * *